(12) United States Patent
Lequio

(10) Patent No.: US 11,198,449 B2
(45) Date of Patent: Dec. 14, 2021

(54) INTEGRATED URBAN MOBILITY SYSTEM

(71) Applicant: ITALDESIGN-GIUGIARO S.P.A., Turin (IT)

(72) Inventor: Marziella Lequio, Peveragno (IT)

(73) Assignee: ITALDESIGN-GIUGIARO S.P.A., Turin (IT)

( * ) Notice: Subject to any disclaimer, the term of this patent is extended or adjusted under 35 U.S.C. 154(b) by 97 days.

(21) Appl. No.: 16/643,897

(22) PCT Filed: Sep. 3, 2018

(86) PCT No.: PCT/IB2018/056701
§ 371 (c)(1),
(2) Date: Mar. 3, 2020

(87) PCT Pub. No.: WO2019/049014
PCT Pub. Date: Mar. 14, 2019

(65) Prior Publication Data
US 2020/0276990 A1    Sep. 3, 2020

(30) Foreign Application Priority Data

Sep. 5, 2017   (IT) .................. 102017000099365

(51) Int. Cl.
| | |
|---|---|
| *B60W 60/00* | (2020.01) |
| *G01C 21/34* | (2006.01) |
| *G05D 1/02* | (2020.01) |
| *G08G 1/00* | (2006.01) |

(52) U.S. Cl.
CPC ... *B60W 60/00253* (2020.02); *G01C 21/3423* (2013.01); *G01C 21/3438* (2013.01); *G05D 1/0297* (2013.01); *G08G 1/202* (2013.01)

(58) Field of Classification Search
CPC ..... B61D 41/04; B60N 2/002; B61L 15/0027; B61L 15/0072; B61L 15/0081; B61L 27/0077; G06Q 10/02; G06Q 50/30
See application file for complete search history.

(56) References Cited

U.S. PATENT DOCUMENTS

| | | | |
|---|---|---|---|
| 2017/0123421 A1 | 5/2017 | Kentley et al. | |
| 2019/0035282 A1* | 1/2019 | Ferguson | ............... G06N 20/00 |

OTHER PUBLICATIONS

International Search Report and Written Opinion for International Patent Application No. PCT/IB2018/056701, dated Dec. 3, 2018. 10 pages.

* cited by examiner

*Primary Examiner* — Ramsey Refai
(74) *Attorney, Agent, or Firm* — Armstrong Teasdale LLP

(57) ABSTRACT

An on-demand transport system is provided which includes a plurality of single-occupant transport devices and a fleet of autonomously driven service vehicles, each of which is adapted to carry at least one single-occupant transport device for its delivery or collection at a respective delivery or return site, following a request from a user. An electronic management system is designed to handle the fleet of service vehicles for delivery or collection of the single-occupant transport devices.

9 Claims, 3 Drawing Sheets

INTEGRATED URBAN MOBILITY SYSTEM

CROSS-REFERENCE TO RELATED APPLICATIONS

This application is a National Phase filing of PCT International Application No. PCT/IB2018/056701, having an International Filing Date of Sep. 3, 2018, claiming the benefit of priority to Italian Patent Application No. 102017000099365, having a filing date of Sep. 5, 2017, each of which is hereby incorporated by reference in its entirety.

FIELD OF THE INVENTION

The present invention relates to mobility systems, such as urban public transport systems, and more specifically to an on-demand transport system having the features described below and an integrated urban mobility system using said on-demand transport system.

BACKGROUND OF THE INVENTION

Public transport systems, although organized on different network infrastructures, either on promiscuous ways and on their own ways, and although providing a network of capillary connection lines extended over a predetermined territory, in which the connection lines are served with various types of collective transport vehicles (vehicles such as buses or trolleybuses, surface or underground railway vehicles, such as trams, underground trains, local trains, water vehicles such as ferries, steamboats, motorboats) do not ensure reaching each destination of a user, leaving the user to have to travel autonomously (often on foot) a more or less long distance, or requiring transit between several connecting lines and respective transport vehicles to get as close as possible to the destination. In the most disadvantageous cases, if the destination is not adequately served, the public transport system fails to achieve a valid alternative to private transport.

All this can lead to a partial inability to satisfy the needs of users of a public transport service and/or reduced use of the same service. In the worst cases, this inadequacy determines an excessive use of private transport, often exceeding the real needs of moving of users, with increasing traffic problems and environmental pollution, especially when no sharing techniques ("car sharing") of private means of transport are adopted in order to reduce the number of vehicles traveling to the same destination.

SUMMARY OF THE INVENTION

The present invention therefore aims to provide a satisfactory solution to the problems described above, while avoiding the drawbacks of prior art.

According to the present invention, this object is achieved by an on-demand transport system as described and claimed herein.

Particular embodiments are also described.

A further subject of the invention is a urban mobility system as claimed.

In summary, the present invention is based on the principle of integrating a urban mobility system, such as a public transport system typically comprising a plurality of connecting lines traveled by a fleet of collective transport vehicles extended over a predetermined territory, with a single-occupant on-demand transport system for short distances, based on the provision of single-occupant transport devices that are delivered by one of a fleet of service vehicles (delivery or collection shuttles) at a delivery location predetermined by a requesting user, such as the place of domicile or a predetermined interchange site, for example corresponding to a stop station of the public transport system or a parking space for private transport means.

The same single-occupant transport devices are collected after use by one of a fleet of service vehicles at the place of destination of the user who has used them or at a predetermined interchange site corresponding to a stop station of the public transport system or parking space for private transport means.

For the purposes of the present description, "single-occupant transport device" means a transport device for one person, who is its driver, for example a means of transport with muscle propulsion and purely mechanical drive operated by means of the driver's muscular energy alone, that is, the movement of which is determined by human thrust, such as a bicycle, a push scooter, a pair of skates, a skateboard, or an electric propelled means of transport, such as a segway, or a hybrid propelled means of transport, such as an assisted-pedaling bicycle. In general, by "single-occupant transport device" it is meant, for example, but not necessarily, a transport device with autonomy of travel on short distances or on distances below the distances covered by the lines of a public transport system, generally served by collective means of transport.

The system of the invention comprises an electronic platform for the management of the temporary assignment of single-occupant transport devices and management of the movement of the fleet of service vehicles in the urban territory area for the delivery/collection of the single-occupant transport devices required in automatic mode through robotic arms and platforms.

The system of the invention also makes use of a reservation application for a delivery/collection service for a single-occupant transport device.

Specifically, a urban mobility service in general, and public transport in particular, integrated by means of said single-occupant on-demand transport system, appropriately identified by the "Last mile on demand" name, is advantageously provided through an executable software application at a personal portable electronic device, such as a personal communication device (for example, a smartphone) that allows a user to request a preferred means of transport by indicating a place of delivery, for example at home, at a user's current location or a selected delivery location among a plurality of predetermined sites. The user can then use the means of transport required to the desired destination, where he will park it, for example in special areas intended for the purpose.

BRIEF DESCRIPTION OF THE DRAWINGS

Further features and advantages of the invention will appear more clearly from the following detailed description of an embodiment thereof, given by way of non-limiting example with reference to the accompanying drawing, in which.

DETAILED DESCRIPTION

Figure 1:
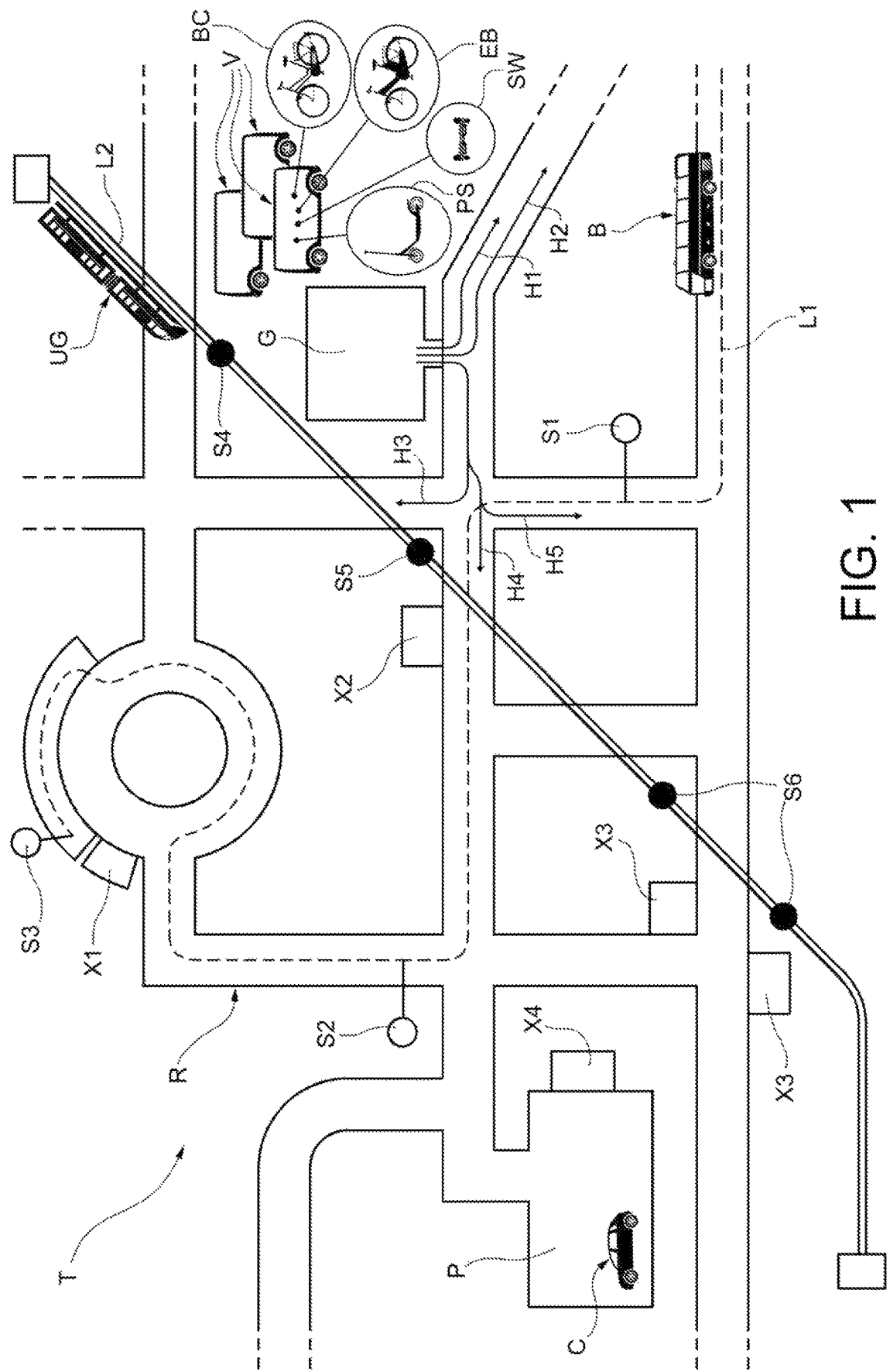
FIG. 1 schematically shows an integrated urban mobility system with an on-demand transport system of the invention, in an area of territory.

FIG. 1 schematically shows an area of urban territory T comprising a road network R at which a public transport service network infrastructure is built which includes, by way of non-limiting example, surface connection lines, among which a public road transport line L1 served by bus B which has stop stations S1, S2 and S3 and a public underground transport line L2 served by trains U with stops S4, S5, S6 at the surface roads.

The figure also shows a parking area P for private transport vehicles, among which a car C.

Figure 2:
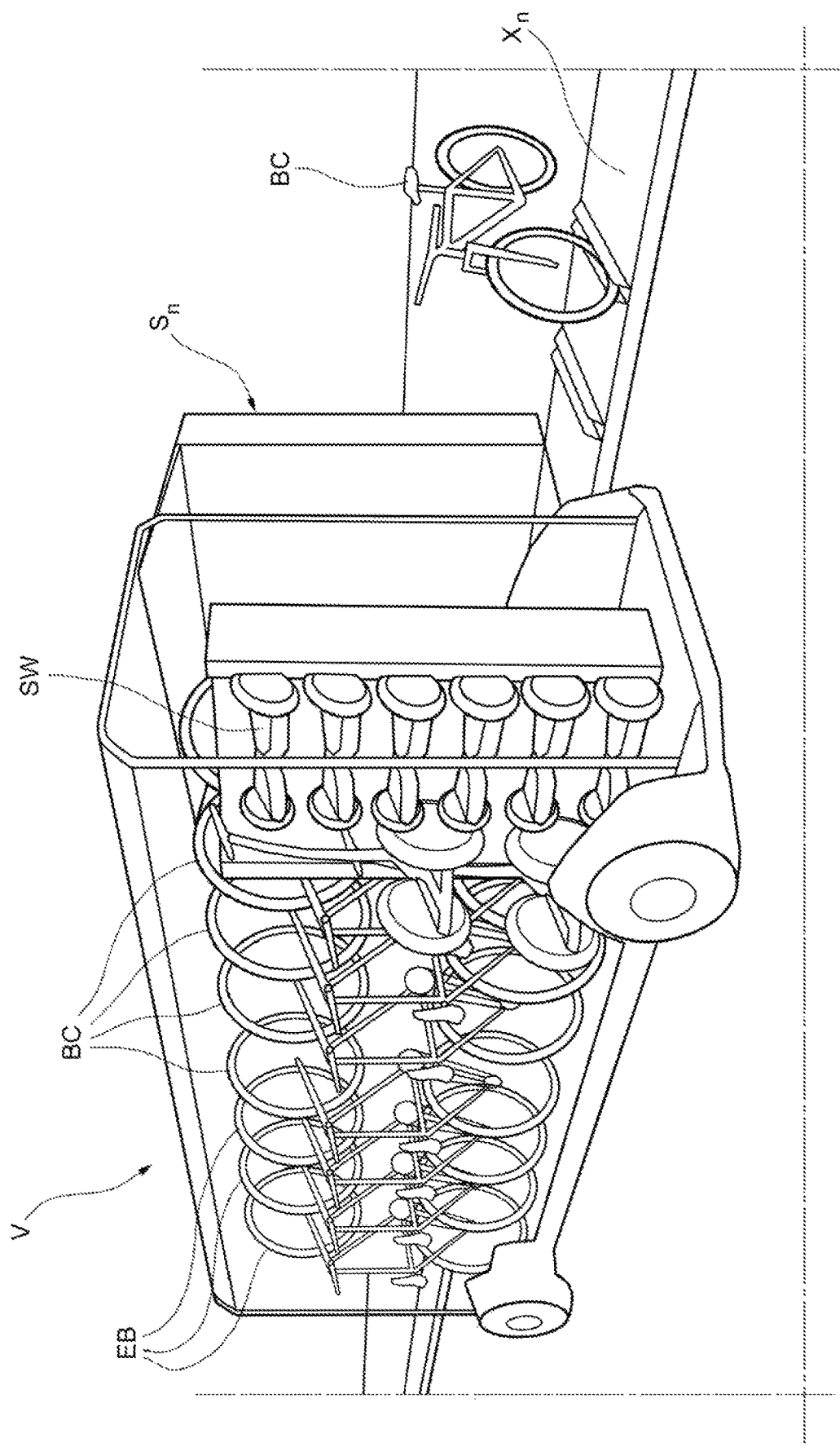
FIG. 2 shows a possible embodiment of a service vehicle of the invention.

A fleet of service vehicles for the delivery and collection of single-occupant transport devices is represented by the vehicles V, to which the representations of some types of single-occupant transport devices are associated by way of example, such as a bicycle BC, an assisted-pedaling bike EB, a segway SW, a push scooter PS. An embodiment of a service vehicle V is shown by way of example in FIG. 2.

The service vehicles V are self-driving electric propulsion platforms equipped for example with the following systems:
- an autonomous driving system adapted to drive the vehicle to a planned destination, as will be described in detail below;
- a motorized storage system for various single-occupant transport devices, aimed at optimizing the delivery and collection of said devices;
- a system for the delivery and collection of single-occupant transport devices, provided with sensors and robotic arms capable of collecting a parked single-occupant transport device;
- an electric power charging system for single-occupant electric and hybrid propulsion transport devices.

The fleet of service vehicles V is located at a garage G where each service vehicle is equipped with one or more single-occupant transport devices. Each service vehicle is designed to cover a specific area of the territory, remaining as long as possible on the road in order to be closer to the users and load on board the single-occupant transport devices temporarily parked. For example, a service vehicle V can follow predetermined paths or paths calculated from time to time on the entire urban road network, the figure showing by way of example five paths H1-H5 emerging from the garage G with a linear section oriented in the direction of travel, represented only in the initial section in order not to make the design complicated. Naturally, without departing from the principles of the invention, the garage G for the service vehicle fleet V may be a distributed garage whereby sub-fleets of service vehicles are located at different locations within the territory.

An infrastructure of interchange sites or parking lots X1, X2, X3, X4, preferably located at stop stations of public transport connection lines (S3, S5, S6 in the figure) or parking areas for private transport vehicles (P in the figure), may be arranged for temporary parking of one or more single-occupant transport devices.

Advantageously, the infrastructure of interchange sites or parking lots for the various single-occupant transport devices is distributed on the territory area (after a preliminary planning) and sized for the intended use, for example in order to optimally cover the area of territory in relation to the stop stations of the public transport network or according to a statistical analysis of mobility demand in the territory received over a period of observation. The areas reserved for parking of single-occupant transport devices preferably have a minimal impact on urban infrastructure and can be located, for example, at public transport stop stations or requested by private individuals who wish to use the service.

Even more advantageously, the aforesaid interchange sites may also be provided with electric charging systems for single-occupant electric or hybrid propulsion transport devices.

Figure 3:
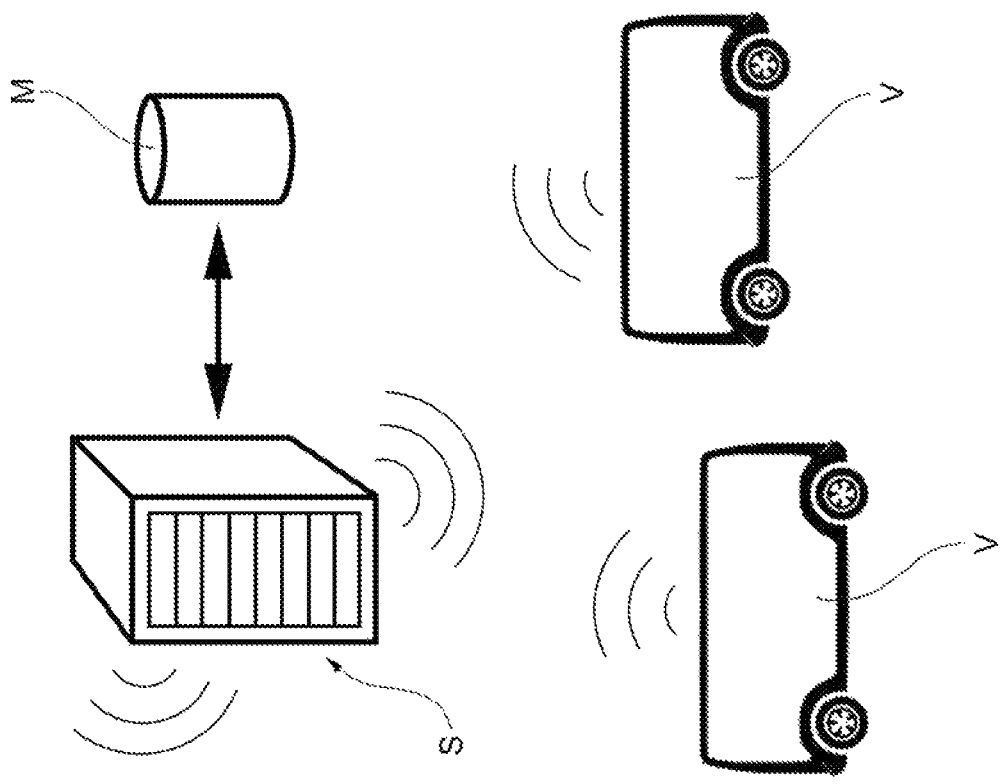
FIG. 3 schematically shows the interaction between a user and the integrated urban mobility system with an on-demand transport system of the invention.
Figure 3:
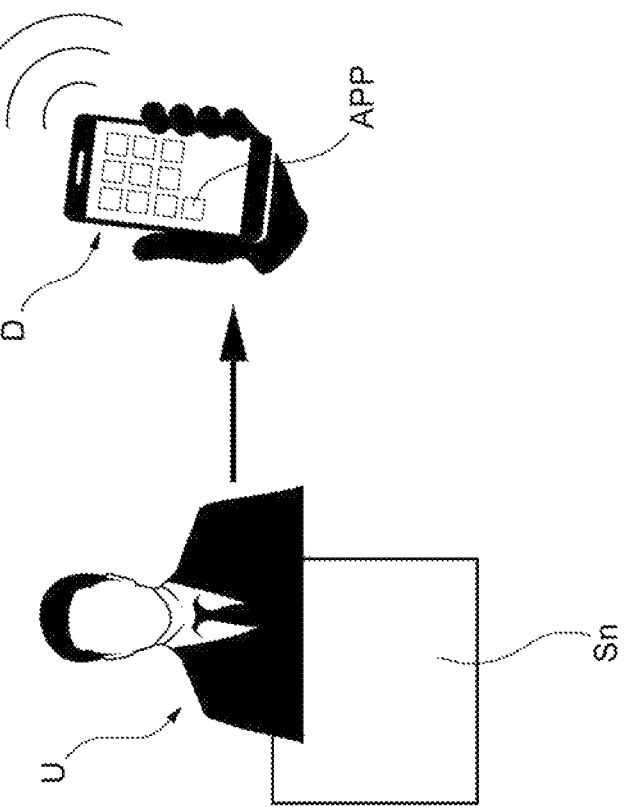

With reference to FIG. 3, a user U is shown schematically, located in the urban area of FIG. 1, for example in any of the stop stations of public transport connection lines or at his home or at another location identifiable by reference coordinates, such as a street address or a set of geographical coordinates of a road map M of said territory, herein indicated generically with Sn.

The user is in possession of a personal mobile telecommunication device D on which a software application is resident whose execution generates a computing environment APP adapted to provide the user with interface functions (for example, registration and/or access) with the on-demand transport system of the present invention. The device D is provided with data input means, such as—by way of example—a touch screen, control keys, image acquisition means, voice recognition means or biometric characteristic recognition means, for example adapted to allow the input of a first data identifying the user's subscriber credentials, if the service is reserved for subscriber users and adapted to enter at least one of:
- a request for delivery of a single-occupant transport device;
- a request for collection of a single-occupant transport device;
- an indication of the reference coordinates and time for the delivery or collection of the single-occupant transport device.

Basically, through the computing environment APP (the application) it is possible to select and request a single-occupant transport device among those available in a specific place and at a certain time.

The personal mobile telecommunication device D is adapted to perform a process of locating its current position or to receive a position data on said road map M and is arranged to transmit said position data together with a request for delivery/collection of a type of single-occupant transport vehicle and any additional information (delivery time, hourly reservation, service identification codes, . . . ) and receive information communications such as communications of service terms.

With reference to FIG. 3, it shows a telecommunication connection of a known type (for example on a UMTS or LTE network) between the personal mobile telecommunication device D and an electronic management platform S which basically comprises for example a computerized workstation (workstation) or a server of known type having a processing subsystem, a possible display device and any means of entering data and commands for a human operator, and is connected to (or integrated with) a database comprising a road map M of the area of territory on which the on-demand transport system of the invention extends.

The management platform S is designed to process one or more computer programs locally stored or accessible on the network that manage the temporary assignment of single-occupant transport devices to users who request them according to the availability of the selected transport device and the localization of the users (or of the delivery site of said single-occupant transport device that the user indicates)

and of the selected devices themselves. The management platform S is also designed to manage the movement of the fleet of service vehicles in the area of urban territory for the delivery/collection of the assigned single-occupant transport devices. More specifically, the management platform S is designed to drive the vehicle to a planned destination, such as an interchange site X1-X4 or other current or planned location of delivery or collection of a single-occupant transport vehicle.

Even more specifically, according to a currently preferred embodiment, the management of the fleet of service vehicles takes place according to the location of the users (or the site of delivery or collection of the single-occupant transport device indicated by the users) and of the selected devices and of the indicated delivery/collection time, for example on the basis of a distance relationship between the delivery or collection site and each of a plurality of interchange sites where a plurality of single-occupant transport devices distributed on the territory is parked. In particular, the management of the fleet of service vehicles takes place through the communication to each service vehicle of the respective navigation instructions calculated on the platform S for driving a service vehicle at a destination acquired through the communication of a user U to the platform S by the application residing on the device D, according to the reference location coordinates of the user to whom the single-occupant transport device is to be delivered or the reference coordinates for the location of the single-occupant transport device to be collected, as well as and of the indicated time for the delivery or collection of the aforementioned single-occupant transport device.

An on-line navigation with continuous communication between the management platform and the service vehicle during a delivery/collection mission is preferably implemented in which, by way of example, the management platform S communicates with the service vehicles V through a telecommunication systems of a known type (for example on a UMTS or LTE network).

Naturally, the management platform S may be a distributed management platform, but this solution referred to herein is considered well known in the art and will not be further described herein as it is not relevant for the purposes of implementation and understanding of the present invention.

By the above system, at the set time an autonomous driving service vehicle will arrive at its destination, thereby delivering the selected single-occupant transport device to the user. The user can use the selected transport device at will or according to agreed terms and return it by depositing it at a dedicated site or requesting the collection in a specific place at a certain time. At the pre-established time a self-driving service vehicle will arrive at the destination allowing the user to return the transport device to it.

Advantageously, the planning of the management platform S allows intelligently managing a fleet of autonomous vehicles, thus maximizing the efficiency of the routes for the delivery and collection of the transport devices.

It should be noted that the proposed embodiment for the present invention in the foregoing discussion has a purely illustrative and non-limiting nature of the present invention. A man skilled in the art can easily implement the present invention in different embodiments which however do not depart from the principles outlined herein and are therefore included within the scope of protection of the invention defined by the appended claims.

This applies in particular to the possibility of providing for the use of the system described according to pre-established terms of use, subscriptions and payment and charging systems which are outside the scope of the present invention.

What is claimed is:

1. An on-demand transport system comprising:
a plurality of single-occupant transport devices;
a fleet of autonomous driving service vehicles, each autonomous driving service vehicle of the fleet being adapted to carry at least one single-occupant transport device and being equipped with a navigation system and arranged for circulation on a road network of a predetermined territory for delivery or collection of the at least one single-occupant transport device; and
an electronic management system coupled to a road network map of the predetermined territory for moving the fleet of autonomous driving service vehicles on the road network for delivery or collection of the plurality of single-occupant transport devices,
the electronic management system being adapted to receive a request for delivery of a single-occupant transport device to a delivery site identifiable on the road network map, or a notice of return of a single-occupant transport device at a return site identifiable on the road network map, and
said electronic management system being arranged for:
temporarily assigning a single-occupant transport device to a user requesting it, as a function of location of the delivery site of the single-occupant transport device and of location of the single-occupant transport device;
selecting an autonomous driving service vehicle from the fleet of autonomous driving service vehicles for delivery or collection of the assigned single-occupant transport device; and
calculating a delivery or collection path of the single-occupant transport device to a predetermined delivery site or a predetermined collection site and providing navigation instructions to the autonomous driving service vehicle for the calculated path.

2. The on-demand transport system of claim 1, further comprising a user interface computer environment implemented as an application resident on a personal mobile telecommunication device of the user, arranged for acquisition of data indicative of location of the predetermined delivery site or the predetermined collection site of a single-occupant transport device and delivery or collection time, and for communication of the data to the electronic management system of the on-demand transport system through a telecommunication network.

3. The on-demand transport system of claim 2, wherein the location data includes reference coordinates of a current location of the personal mobile telecommunication device of the user or geographic coordinates of an interchange site of the road network.

4. The on-demand transport system of claim 3, wherein the interchange site is located near a stop station of a public transport system or near a parking for private transport vehicles.

5. The on-demand transport system of claim 4, wherein the electronic control system is arranged to periodically plan a predetermined distribution of the plurality of single-occupant transport devices at a plurality of interchange sites located on the predetermined territory.

6. The on-demand transport system of claim 1, wherein the plurality of single-occupant transport devices includes at least one single-occupant transport device based on muscular propulsion, on electric propulsion, or on hybrid propulsion.

7. The on-demand transport system of claim 1, wherein each autonomous driving service vehicle of the fleet of autonomous driving service vehicles includes means for moving a single-occupant transport device arranged for releasing the single-occupant transport device to the user requesting it or for collecting the single-occupant transport device from the user requesting it.

8. The on-demand transport system of claim 1, wherein each autonomous driving service vehicle of the fleet of autonomous driving service vehicles includes an electric power charging system for at least one electric or hybrid propulsion single-occupant transport device.

9. An integrated urban mobility system, comprising a plurality of connecting lines extending over a predetermined territory for travel of a fleet of collective transport vehicles and the on-demand transport system of claim 1.

* * * * *